March 5, 1940.  E. S. HINELINE  2,192,740
CAMERA MECHANISM WITH CORRELATED RANGE AND
VIEW FINDER AND FOCUSING PROJECTOR
Original Filed July 29, 1937  3 Sheets-Sheet 1
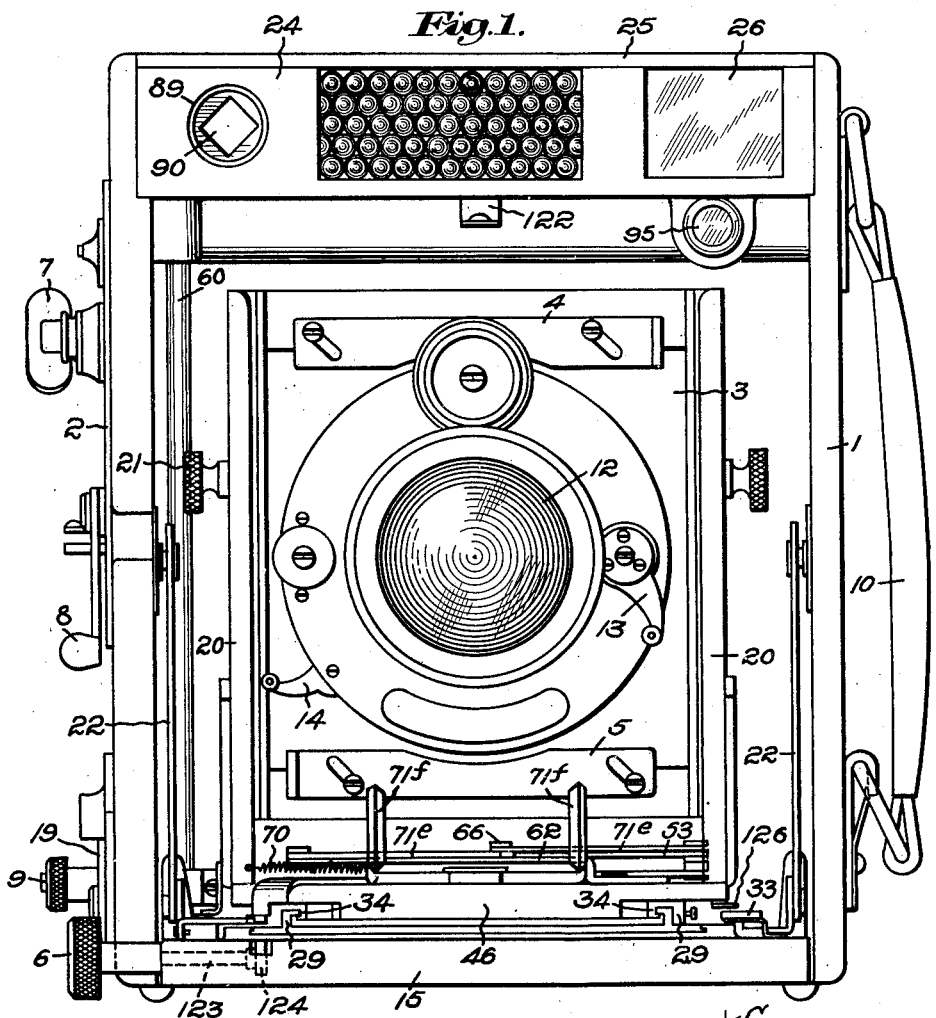
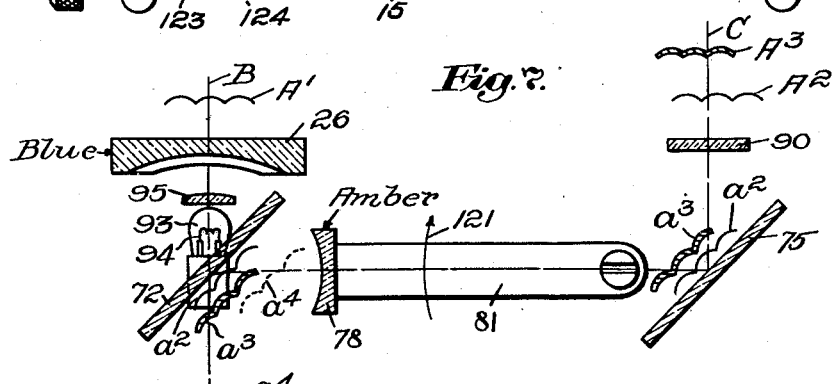
Inventor:
Edson S. Hineline, March 5, 1940.  E. S. HINELINE  2,192,740
CAMERA MECHANISM WITH CORRELATED RANGE AND
VIEW FINDER AND FOCUSING PROJECTOR
Original Filed July 29, 1937   3 Sheets-Sheet 2
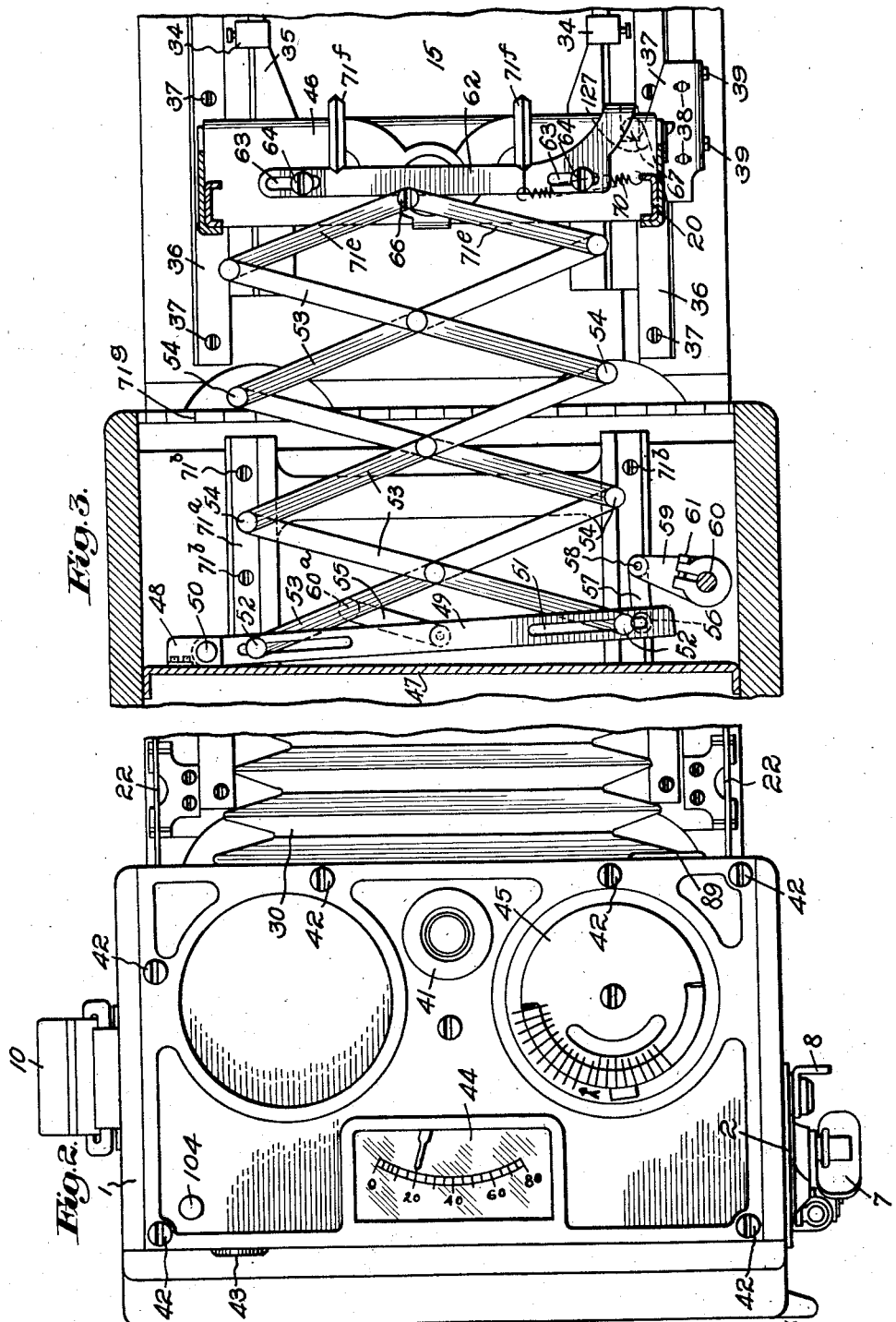

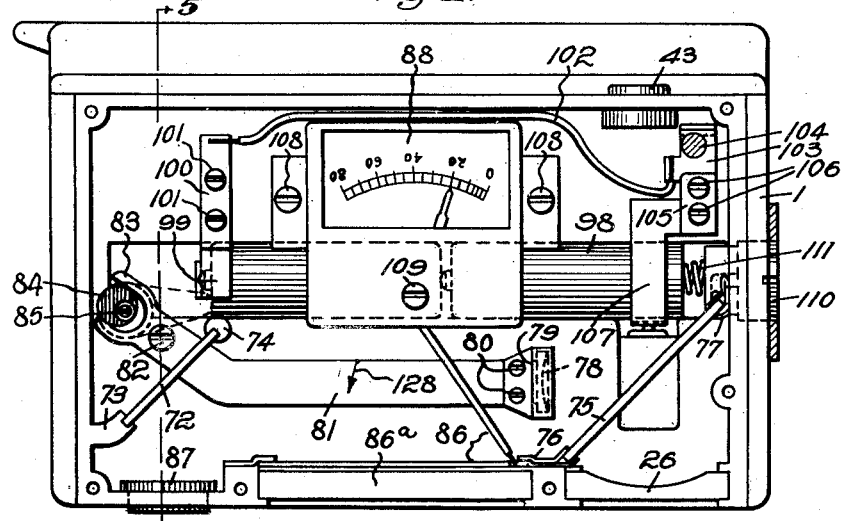
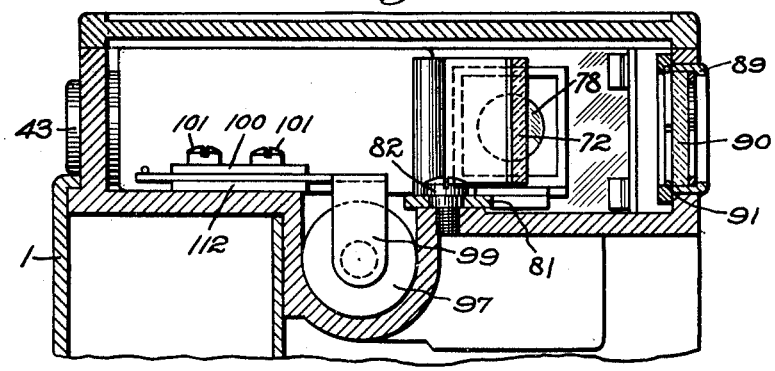
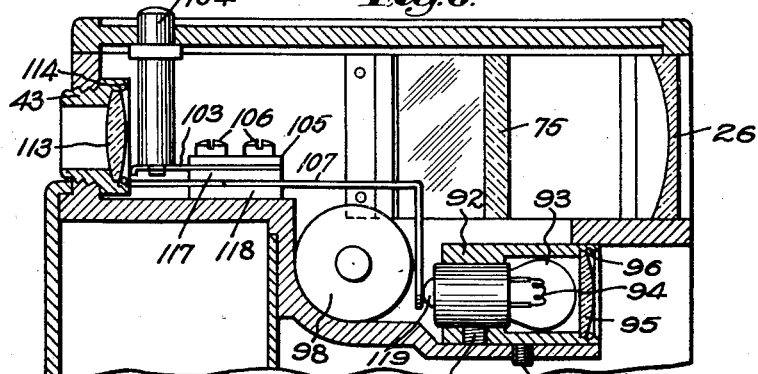

Patented Mar. 5, 1940

2,192,740

UNITED STATES PATENT OFFICE 2,192,740

CAMERA MECHANISM WITH CORRELATED RANGE AND VIEW FINDER AND FOCUSING PROJECTOR

Edson S. Hineline, Rochester, N. Y., assignor to The Folmer Graflex Corporation, Rochester, N. Y., a corporation of Delaware Original application July 29, 1937, Serial No. 156,360. Divided and this application June 13, 1939, Serial No. 278,887

3 Claims. (Cl. 95—44)

This application is a true division of my copending application Ser. No. 156,360, filed July 29, 1937, which has issued as Patent No. 2,167,436 dated July 25, 1939, and is filed for the purpose of receiving all claims from said parent application directed to a correlted range and view finder and a focusing projector built into a camera mechanism for the purpose of permitting accurate use of the range finder in insufficient natural light.

In order that the principle of the invention may be readily understood, I will disclose a single embodiment thereof, to which I am in no wise limited.

The invention relates to a new camera with certain built-in coordinated features that enable the operator to carry out the various functions in making a photograph with great accuracy and rapidity.

One of the preliminary functions is that of positioning the lens in such relation to the focal plane that the image formed at the focal plane will be in sharp focus. There are several methods of doing this, some of which are as follows: (a) focusing on a conventional ground glass screen, or (b) setting the camera to a predetermined scale, either measuring or guessing at the distance, or (c) using an optical device that is interconnected with the moving front part of the camera which normally carries the lens. In the camera herein disclosed this feature or optical device just referred to is built into the camera and is permanently connected at all times. A further requirement in photographing effectively is that the user may be able to view the exact image that is being photographed, and it is a great advantage that he be able to view this image while focusing and up to the exact time of exposure. This is one of the cooperating built-in features of the camera herein disclosed.

It is frequently necessary to make photographs in places where the illumination is at a very low level, in fact so low that it is impossible to focus either by the conventional ground glass method or with an optical range finder. In the camera herein disclosed there is a built-in projector that cooperates with the built-in optical range finder in that it will project an image on the object being photographed, and the distance of such image can then be accurately determined by using the built-in optical range finder. When this distance is ascertained the camera will be in exact focus.

A more complete understanding of my invention can be had from the following description, in which:

Fig. 1 is a front elevation of the camera with the door open and the bellows extended;

Fig. 2 is a top plan view of the camera with the door open and the front extended;

Fig. 3 is a horizontal section through a part of the camera showing the coupling mechanism between the front of the camera and the range finder mechanism;

Fig. 4 is a top plan view of the camera with the range finder cover removed to show the arrangement of the various parts that go to make up the range finder, the placement of batteries and the battery contact mechanism for the built-in projector, as well as the photoelectric cell and meter;

Fig. 5 is a vertical section of Fig. 4 on the line 5—5 thereof;

Fig. 6 is a vertical section of Fig. 4 parallel to the section for Fig. 5 but taken adjacent to the opposite side of the camera; and Fig. 7 is a schematic diagram of the range finder when employing the projector in correlation, in insufficient natural light.

The invention is particularly directed to a camera having built thereinto as correlated features a range and view finder and a focusing projector, which are so coordinated as to provide a camera meeting all requirements of accuracy and rapidity of performance and yet capable of being collapsed or closed into small compass. Briefly stated, the features which are herein disclosed as built into the camera in such manner that they combine in producing the desired results, are a range and view finder and a projector which enables the range finder to be employed even though the light is so poor that proper focusing could not be done either with an ordinary optical finder or upon ground glass.

I am aware that in combination range finders and view finders, it has long been common to use in the optical group two mirrors, both of which are in some cases stationary or one of which is mounted for rocking movement as in the German patent to Alard du Bois-Reymond, No.188,342, September 23, 1907, and in the United States patent to Woodbury, No. 1,238,473, August 28, 1917. The range finder herein disclosed differs from all those of the prior art known to me in a number of respects which will be pointed out in detail and which include the mounting of a negative lens between two stationary mirrors, the said negative lens being operatively connected to the movable front or front standard of the camera.

In the ensuing description, I will set forth numerous advantages that flow from my invention, the selected embodiment of which is herein shown. Without limiting my invention to the structure herein disclosed, I will now specifically refer to the selected embodiment or example of my invention, and will first refer to the construction shown in Figs. 1, 2 and 3.

The box or casing of the camera is indicated at 1 in the figures wherein the same is shown. It may be of any suitable character and construction, although it is herein indicated as the so-called "Press" type of camera, commonly known as the Speed Graphic Camera, to which type of camera my invention is not limited, it being merely the selected embodiment of the invention. The shutter plate of the camera is indicated at 2 in Fig. 2, the lens board is represented at 3, the upper latch for said lens board at 4, and the lower latch therefor at 5. The focusing knob is represented at 6 and the focal plane shutter winding knob at 7. The release for the focal plane shutter is represented at 8, and the tension knob for the focal plane shutter at 9. The carrying handle for the camera is indicated at 10. The objective lens is represented at 12 in Fig. 1, the shutter set lever at 13, the shutter release at 14, and the camera bed at 15. The focal plane shutter curtain is not shown, but is provided with upper and lower curtain rollers.

The front side rails of the camera are indicated at 20, the front side brace is indicated at 22, and the camera front clamp at 71f. The foregoing features may be of any usual or suitable construction, and need not be more particularly described.

The camera is provided with a combined range and view finder, which will be described in detail hereinafter. The housing therefor is represented at 24 in Fig. 1, and in greater detail in Figs. 4, 5 and 6. It is provided with a cover plate 25 and with a view and range finder lens 26, which, as clearly indicated in the diagram, Fig. 7, is a negative lens.

The said range finder is a combination view finder and range finder by which I mean that the exact image is seen at all times through the lens 26 when the range finder adjustment is taking place. Thus the operator is viewing the subject up to the instant of making the exposure. The said view finder 26 is also one element of the range finder itself. The elements that go to make up the range finder are more particularly described hereinafter.

In order to provide operating means for the range finder, I have preferably employed two cams one of which is indicated at 37 in Fig. 3, and which I term range finder focusing cams. The cam 37 is positioned for short focus lenses and the other cam (not shown) would be positioned for long focus lenses. I may within the scope of my invention employ a single variable cam for this purpose and change the position thereof from that indicated in the several figures for cam 37 to the position of the other cam. I prefer, however, to employ two different cams.

The camera is provided with a front track, clearly shown at 29 in Fig. 1. The camera bellows is indicated at 30 and has the usual front board.

The so-called infinity stops are indicated at 34, in Fig. 3, and the camera-front track shoes are indicated at 35. The track guide rails for the camera are indicated at 36, and the retaining screws therefor at 37. I have provided lock screws for the range finder focusing cam or cams, the same being represented at 38 in Fig. 3, and which are employed for securing in position both the said focusing cam or cams. I also provide in this connection focusing-cam adjusting screws shown at 39. A suitable latch plate for the hinged front or door of the camera is provided, and cooperating therewith is a release button 41, shown in Fig. 2. Adjacent thereto and suitably distributed are retaining screws 42 for the range finder cover 25. At the extreme left in said Fig. 2, the range finder eye piece is indicated at 43. It is also shown in Fig. 4. Adjacent thereto, there is represented at 44 the photo cell meter. The exposure calculator is indicated at 45.

Before describing in detail the range and view finder itself, I will first describe the preferred means for operating the movable element thereof, namely, the negative lens positioned between two stationary mirrors. In order to move the said lens in causing the range finder to function, I may provide (though my invention is not limited thereto) substantially the same means for connecting said movable element with the front or front standard of the camera that I employ in my co-pending application Ser. No. 155,259, filed July 23, 1937, now Patent No. 2,167,435, dated July 25, 1939, for turning the pivoted mirror in the optical group shown in said application. My invention is not limited to the employment of any particular means for causing the conjoint movement of the camera front and the movable member of the optical group. As stated, however, I may employ substantially the same connecting means, and I will now proceed to describe the same specifically without limiting my invention thereto, and in this connection I will refer particularly to Figs. 1 and 3.

The so-called front standard or movable front of the camera is indicated at 46. The rear bellows frame is indicated at 47 and attached thereto is a bracket 48 for the base rod or bar 49 of the toggle mechanism. The said rod or bar 49 is pivoted to the bracket 48 by a suitable rivet 50, and is provided with two lengthwise extending slots 51, which receive rivets 52, 52 that are provided upon the innermost of the toggle arms 53, 53. A number of toggle arms 53 are indicated which are all suitably connected by rivets 54. There is also provided a toggle arm centering link at 55 which connects the rod or bar 49 with one of the toggle arms 53, as clearly indicated in Fig. 3. Extending from rod or bar 49 and suitably connected thereto by a rivet 56 is a toggle-arm-mechanism-connecting link 57 that is also connected by rivet 58 to an arm 59 upon the range finder control rod or shaft 60, which is mounted in the camera casing in an upright position close to one wall of the camera casing, as shown in Figs. 1 and 3, and in a manner similar to that disclosed in my said application Ser. No. 155,259. As clearly shown in Fig. 3, there is provided a clamp screw 61 for securing the arm 59 upon the said rod or shaft 60.

The two slots 51, 51 allow the rivets 52, 52 to slide toward the lengthwise center of the rod or bar 49 or away from the said center depending upon the distance the toggle joint has been separated. In order that the toggle joint mechanism may always travel centrally with respect to the rod or bar 49, the short length bar 55 is provided, as already stated. It is attached to one of the toggle bar arms 53 and to said bar 59 by shoulder rivets 60a.

Mounted transversely upon the camera front or front standard or upright 46, I have provided a cam follower arm or member 62 which is provided with lengthwise extending slots 63, 63 in which are received screws 64, 64 for retaining the same but permitting it to be moved in the direction of its axis under the influence of the focusing cam 37. The said arm or member 62 is provided with a threaded hole for the reception of a toggle arm connecting screw 66, by which the said arm or member is connected to the toggle mechanism. The said arm or member 62 is provided with a cam follower roller 67, shown in dotted lines in Fig. 3. There is also provided in said bar or member a hole for the reception of a spring 70 by which the roller 67 is held in contact with the cam formation of the cam 37. The other end of the said spring 70 is secured in an opening in one of the camera front side rails.

It will be very clearly seen that any movement in a lengthwise direction of the cam follower bar 62 (that is, a movement transversely of the camera) will transmit movement to the toggle joint bar 49 and thence through the link 57 and arm 69 to the range finder control rod or shaft 60.

As clearly shown in Fig. 3, the camera case 1 is provided in the box portion thereof with a short section of track indicated at 71a, 71a, fastened to the said box structure by screws 71b. On the camera bed or door 15 are fastened camera track rails 36, 36 by screws 37, 37. The camera tracks 29, 29 slide in the said rails 36, 36 and are caused to move forward and backward by means of the focusing knob 6, previously referred to.

It will be understood that as the camera front or upright 46 is pulled forward, the cam roller 67 of the arm or member 62 will ride upon the edge of the focusing cam 27, or cam 28, as the case may be, causing the said cam follower arm or member 62 to move in a direction transverse to the longitudinal axis of the camera. This motion is transmitted through the screw 66, the short arms 71e, 71e, and the longer arms 53 of the toggle joint mechanism, through the rivets 54 to the toggle joint slotted rod or bar 49, the connecting link 57 and the arm 59 to the control rod or shaft 60. Thus the inward movement of the camera front or upright 46 collapses the entire toggle arm structure.

It will be understood that in the foregoing movements the roller 67 follows the edge of the focusing cam 27 or cam 28, causing the cam follower arm or member 62 to move in such manner as to move the slotted toggle bar 49 toward the back of the camera. Through the link 57 and the lever arm 59 a counterclockwise motion is imparted to the range finder rod or shaft 60.

When the camera is closed for transportation or otherwise, the camera front or upright 46 is caused to be slid all the way back by squeezing toward each other the camera front locks, indicated at 71f, 71f in Figs. 1 and 3, which causes the camera track shoes 35 to be pulled toward each other and thus to be released from the tracks 29 and allowed to slide freely thereon. When the camera locks 71f, 71f are squeezed toward each other and the camera front mechanism is pushed back, the shoes 35, 35 override the tracks 71a, 71a within the camera casing or box, thus allowing the camera to be completely folded, after which the camera door or bed 15 is swung upon the hinge 71g into closed position.

I will now describe the range and view finder itself and the optical group thereof, and for this purpose I will refer particularly to Figs. 4, 5 and 6.

In Fig. 4, what I term a first-surface mirror is indicated at 72. It is supported in the housing 24 of the range and view finder by a lug or boss 73 formed on the wall thereof, and a stud 74. Thus the said mirror is stationarily mounted. The other mirror, which I term a semitransparent mirror is indicated at 75. It also is stationarily mounted, being for the purpose held in a front bracket 76 and a rear bracket 77 secured to the housing 24. By "semitransparent" mirror, I mean one that has a coating whose ratio of reflection to transmission is controlled by the amount of coating. The said two mirrors 72 and 75 are mounted parallel to each other, but the axis of each is at ninety degrees to the axis of an intermediate negative lens 78, which is mounted in a bracket 79. The said bracket is secured by screws 80 to an arm or lever 81 that is pivoted on a shoulder screw 82 (Fig. 4) mounted in the housing 24, and which at its end opposite the negative lens 78 is forked as indicated at 83 to receive a cam 84 attached by a screw 85 to the upper end of the range finder control rod or shaft 60, hereinbefore described.

Before proceeding to describe certain additional features of the said range and view finder and the manner in which the same function, I will sufficiently describe the photo electric cell and meter and certain other parts which are mounted in the said housing 24 and which are correlated with and function with the range and view finder as hereinafter more fully set forth.

I have somewhat diagrammatically indicated a photo electric cell at 85, the lens whereof is indicated at 86a in Fig. 4, said cell being mounted in a bracket 87, being most clearly shown in Fig. 4. I am, of course, aware that exposure meters of various types have been employed in photography. The one which I employ is of a standard photo electric cell type using a microammeter as an indicating device. I have, however, so mounted a cell of that type that the reflected light which is measured thereby is substantially the same as the light that passes through the camera lens to make a photograph.

The photo electric cell herein disclosed, although generally of a standard type, is so constructed that the acceptance angle of the light entering the photo electric cell is substantially the same as that of the angle of the lens making the photograph. Therefore, I obtain a true reading on the exposure microammeter which I have indicated at 88 in Fig. 4, from whatever position the camera has when the exposure is being made.

In Fig. 5 there is shown the range finder aperture ferrule at 89, which receives therein the range finder glass 90 held in place in the ferrule by a ring 91.

In making pictures with the ordinary optical finder or in focusing on the ground glass of the camera when the light is very poor, such operation often takes place with the aid of photoflash bulbs or photoflash powder combinations. In order to enable me, however, to use the present camera at all times regardless of light conditions, and so that regardless of said light conditions the camera can always be accurately focused on whatever subject is being photographed, I have provided a projector which, as will be fully realized and understood from the following description, coordinates and cooperates with the range finder. For that purpose I have provided the following mechanism which is most clearly shown in Figs. 4, 5 and 6.

In the casing 24 of the range finder is provided, as most clearly shown in Fig. 6, a projector housing or barrel 92 which carries a very small or miniature bulb 93 with a tiny coil filament 94. In front of the said filament is placed a lens 95 held in the projector housing or barrel by a ring 96, Fig. 6. The position of the filament 94 in said bulb with respect to the magnifier lens 95 is such that for all distances greater than five feet, the image of the filament 94 in said bulb 93 is projected in universal focus. The bulb 93 is not intended to illuminate the scene or object being photographed, but its function is to project an image which is the resultant light from the said filament 94 of said bulb, onto whatever object is to be photographed. The range finder herein disclosed, in turn, then picks up the image of the filament 94 of the bulb 93 and the focusing adjustment is made precisely as when focusing in daylight. This is a new result and is an important advance in the use of cameras provided with range finders. I am entirely familiar with several types of focusing devices wherein the filament is projected for focusing purposes either through the lens of the camera that makes the picture or by some other type of lens mechanism where the focal length of such lens was very close to the focal length of the camera objective lens. In such cases of the prior art, however, the operator necessarily focused the image projected through whatever means is employed, onto the object that is being photographed, and the error necessarily was always very great because the further away the object being photographed was from the camera, the less accuracy could be had in focusing the image on the filament.

In the practice of my invention, the focus that is obtained on the filament is in reality of no importance, for the focusing of the filament may be considerably in error and yet a very sharp focus on the camera lens with respect to the camera plate or film is obtained through the range finder.

The projector is provided with two batteries 97, 98 of the flashlight type. A rear battery contact is provided at 99, as most clearly shown in Fig. 4. A battery contact insulating strip is provided at 100 held in position by screws 101, 101. The battery contact wire is indicated at 102. The upper switch plate of the battery is indicated at 103 in Fig. 4 and the switch plunger at 104, it being also indicated in Fig. 2. A switch plate insulating block is provided as shown at 105, most clearly shown in Fig. 6, held in position by screws 106. The lower switch plate is represented at 107 and the photo electric cell meter retaining screws are shown at 108 in Fig. 4. In the same figure the zero adjustment screw for said meter is indicated at 109 and at the extreme right in said figure the battery retaining plug is indicated at 110, and the battery retaining plug contact spring is represented at 111. In Fig. 5, the lower insulating block is represented at 112.

As most clearly shown in Fig. 6, there is provided an eye piece lens 113 which is held in position by a ring 114 in the range finder eye piece or ferrule 43.

The projector bulb 93 is held in position by a screw 115 and the entire projector assembly, housing or barrel 92 is held in position in the range finder element by a retaining screw 116. There is also provided, as shown most clearly at the left in Fig. 6, a switch insulating center block at 117 and a lower insulating switch block at 118.

The two batteries 97, 98 are sufficient to illuminate the lamp bulb 93. The circuit is readily traced through the battery 98, battery 97, contact 99, wire 102, switch plate 103, switch plate 107, to the bulb contact 119 in Fig. 6.

The structure of the switch 104 is most clearly shown in Fig. 6, and is there indicated as a button. When the same is in the upper position as indicated in said figure, no current can flow from the contact 103 of Fig. 4 to the contact 107. When the said button 104 is pushed downward the contact 103 engages the contact 107, thus allowing the current to flow through the lamp 93, through the contact 119, through the bulb 93, through the lamp or bulb base thereof, through the projector barrel or housing 92 to the range finder casing or housing 24. In the said range finder housing 24, there is provided, as already stated, the plug 110 with the attached spring 111, thus making the final contact to the battery.

Having thus described the structure of the photo electric meter and particularly of the projector as the same are built into the range and view finder housing, I will next refer to certain other features of the range finder and describe more fully the functioning thereof.

The cam 84 previously described as attached to the upper end of the range finder control rod or shaft 60, provides the means whereby the arm or lever 81 is swung upon its pivotal shoulder screw 82. The negative lens 78 carried by the inner end of the said arm 81 has substantially the same curvature as the view finder lens 26. When the negative lens 78 is in the so-called infinity position, it is with respect to its axis at an angle of about forty-five degrees with respect to the first-surface mirror 72.

I have discovered that by making elements of the range finder of dissimilar colors and particularly by making the lens 26 and the negative lens 78 of dissimilar colors, I obtain a result greatly facilitating the accurate setting or functioning of the range finder. While I am not limited in my selection of colors, I desirably form the lens 26 of blue glass and the lens 78 of yellow or amber glass. The said two colors are an example of so-called complementary or antagonistic colors which, when mixed or blended, produce white or gray light. Other complementary colors are red and verdigris, orange and greenish blue, green-yellow and violet, green and purple, and bluish green and carmine. I preferably, however, use blue glass for the lens 26 and a yellow or amber glass for the negative lens 78.

When the camera is out of focus, the general view as seen on the lens 26 through the eye-piece lens 113 (Fig. 6) is of a bluish color. The displaced image is reflected through the mirror 72 and through the negative lens 78, is then reflected by the mirror 75, and when viewed through the lens 113 is of a yellow color. When the two images exactly overlie or are superimposed one upon the other, the resulting color returns to normal, and there is a considerable stepping up in the brilliancy of the two images. In other words, when exact register is obtained, the image as viewed through the lens 113 is very much clearer than is either the image as viwed on lens 113 or on lens 78 when the two images are displaced.

Other color combinations may be used instead of the blue and yellow or amber preferred by me, but my experimentation shows that a blue lens 26 and a yellow or amber lens 78 provide the best results.

The operation of the optical elements of the range finder when making an exposure and when using the projector is clearly shown in Fig. 7, to which I will next refer.

It will be assumed for purposes of description, but not of limitation, that the negative lens 26 is of blue glass and the movable negative lens 78 is of yellow or amber color as marked in Fig. 7. The said negative lens 78 is of substantially the same focal length as the negative lens 26. The first-surface mirror is indicated at 75 and the semi-transparent mirror at 72. I have indicated at 90 in Fig. 7 and also in Fig. 1, a piece of glass which is placed in the range finder housing and is used merely as an enclosure to prevent dust from reaching the mechanism. In said Fig. 7, I have represented at right and left wavy lines A', A2. They are shown as spaced in said figure, but in reality they represent a single object at infinity. The dotted lines B and C, although represented as parallel, in reality converge at an indefinite distance. An image of the wavy line A' at the left is formed on the lens 26, and when viewed through the magnifier 113 is seen through the mirror 72 and will appear in the magnifier 113 as the small wavy line a' adjacent to said magnifier 113. The same image, but which is indicated as the wavy line A2 at the right, will be viewed through the glass 90 on the mirror 75, will be reflected therefrom and will appear as an image formed on lens 78, will be reflected by the mirror 72, and will be viewed through the magnifier 113, appearing as the small wavy line a2 adjacent the wavy line a' near the magnifier 113. The said two wavy lines a' and a2 near the magnifier lens 113 now exactly overlie each other and the camera is in focus at infinity.

When focusing at a nearer distance, the wavy line A' is viewed through the lens 26, and again will be viewed as the said wavy line a' through the magnifier lens 113. The secondary image A2, however, will be displaced as indicated by the wavy line A3, shown as hatched. It will be reflected by the mirror 75, an image will be formed on the negative lens 78 which will be reflected by the mirror 72, and will be viewed as the adjacent wavy line a3 (appearing as hatched) through the magnifier 113. If the lever arm 81 be swung in the direction of the arrow 121 thereon (which action takes place by reason of the movement of the camera front forward with the objective lens through the range finder connecting mechanism, as previously described), such action will cause the said wavy line a3 to move into the position of the dotted wavy line a4 adjacent the magnifier lens 113. It will be reflected by mirror 72 and will be viewed through the magnifier 113 as such dotted wavy line a4 adjacent the magnifier lens 113. The wavy lines a4 and a' exactly overlie each other under these conditions, and the camera will be in focus for whatever distance the object represented by the wavy lines A' and A2 is from the camera. Adjacent the mirrors 72 and 73 I have indicated, in their corresponding positions, the wavy lines above referred to.

I will now particularly refer to the operation when focusing the camera under what I term insufficient natural light conditions and in that connection will refer to the said diagram, Fig. 7. I have in the foregoing description fully set forth that a projector, such as the bulb 93 with filament 94, is provided which can be illuminated by pushing down the button 104. The image of the filament 94 is projected through the magnifier lens 95 and will fall on the object being photographed.

I am thus able to use the range finder in insufficient natural light, and indeed in the substantially total absence of natural light. This has never before been satisfactorily accomplished so far as I am aware.

It will be observed, viewing Fig. 2, that the switch plunger 104 extends through the top of the camera casing in close proximity to the camera carrying handle 10, so that while the left hand of the operator is holding the camera a finger of that hand can at the proper time press down the plunger 104, and thereby illuminate the tiny projector bulb 93. The right hand of the operator can be used to turn the focusing knob 6, thereby imparting movement to the range finder control rod or shaft 60 and other parts, as fully explained. Thus, in the disclosed embodiment of the invention, the fingers of the left hand of the operator are used to illumine the projector and cause the image of the tiny filament 94 to be thrown onto the object to be photographed, and at the proper time the fingers of the right hand of the operator are employed to turn the focusing knob 6. These two features which intimately cooperate in function are thus under the manual control of the operator.

I am, of course, aware that photo flash bulbs have been attached to cameras carried in the hand, and that such photo flash bulbs are under the manual control of the operator of the camera. Such photo flash bulbs are used only for the purpose of making an exposure, and they are of such power as to illumine the entire object, which is necessarily or usually very close at hand.

I, on the contrary, use the illuminable projector only for the purpose of throwing an image of the tiny filament 94 onto the object which I desire to bring into focus by means of the range and view finder. With the small amount of illumination provided by the filament 94, it would be impossible to focus on an object in total darkness if the light of the illumination were caused to spread over the entire object. My invention, on the contrary, is directed toward suitable means of using a very small source of electrical power and a very small light bulb to get sufficient illumination on a particular spot to enable the camera operator to focus the camera very accurately on that spot. Therefore, I concentrate all of the illumination given off by the filament 94 of the tiny bulb 93 into a very small area, thus intensifying the illumination in this area. There is a period between light and dark in the normal day when the light from the sun is insufficient to allow the operator to focus with any degree of accuracy, and in which situation an ordinary flash light adds practically no illumination. By my invention as embodied in the apparatus herein shown, through the concentration of the light into a very small area, that area is very brilliantly lighted, and that area is confined to an image of the filament. It is this image of the filament onto which the operator focuses. I have found in practice that with the described small source of power (namely, the two very small flash light cells 97, 98), I am enabled accurately to focus on an object fully a hundred feet away. It will be readily apparent, therefore, that if it were attempted to illuminate any great area to be taken in by the photograph, the operator would be compelled to have many times greater electrical power to illuminate the area sufficiently so as accurately to focus.

It will be observed, viewing Fig. 7, that the center of the filament 94 of the tiny electric bulb 93 is substantially on the center line of the negative lens 26. The spot light must be located relatively close to this position shown in order to function properly.

I have in the foregoing part of the specification indicated that instead of employing two focusing cams 27 and 28, I may adjust, lengthwise the camera bed 15, the focusing cam 27. It is to be understood, however, that this could be done only if the cam to be adjusted lengthwise the camera bed is itself provided with means for varying or adjusting the edge thereof, inasmuch as the cam shape necessarily varies with each lens of a different focal length. Therefore, in practice, each focusing cam is used only for a lens of a given focal length. However, I may provide a focusing cam which itself has a form or edge that can be varied or adjusted and therefore adapted to be used in different positions along the camera bed.

I will now briefly refer to the manipulation of the camera the structure whereof has been fully described.

The door 15 of the camera, which when opened out constitutes the bed thereof, is opened by first pressing the button 41, shown in Fig. 2. This depresses a latch 122, so that said latch is disengaged from the bed latch plate. The door 15 can now be opened. The camera front 46 is now pulled outwardly from the camera box by squeezing toward each other the camera bed locks 71f. The camera front is pulled out until the track shoes 35 contact with the infinity stop blocks 34 on the tracks 29. The camera front 46 will then be in the infinity position for the lens when using range finder cam 37 with a short focus lens. However, the camera front 46 can be moved further forward by turning the knob 6, which is attached to a shaft 123 carrying a pinion 124. Said pinion meshes with a rack attached to the camera tracks 29. By turning the said knob 6 in a clockwise direction, the tracks 29 are caused to move forward, carrying therewith the camera front 46, the camera front rails 20, the front bellows frame or board, the shutter and the lens 12. The bellows 30 being attached to the bellows frame or board is also moved forward. When the camera front 46 with the said parts is moved forward to the position shown in Fig. 3, the adjustment is correct for making an exposure for a distance of five feet. By merely turning the focusing knob 6 forward or backward, the camera front 46 with the objective lens, etc. can be adjusted to any position from five feet to infinity. When using a camera for known distances, this method of operation is quite satisfactory without using the range finder. The foregoing description of operation applies when the camera is equipped with a short lens, such as a 5¼" on a 3¼ x 4¼ camera. If, for example, the camera is changed to a 6½" lens, the infinity blocks 34 are accordingly changed, and other movements are made that are not necessary to state in detail. The camera front 46 can be moved to any position along the scale provided, by turning the focusing knob 6 in the manner described.

As already stated with reference to Fig. 4, any motion imparted to the range finder control rod or shaft 60 is transmitted to the cam 84 and will cause a movement of the negative lens supporting arm or lever 81. If the camera front 46 is moved in the forward direction, or for taking a photograph at a close distance, the cam roller 67 is caused to travel up on the cam face 127 of the cam 37, causing the rod or bar 49 of the toggle mechanism to be moved in a lengthwise direction toward the top of the sheet viewing Fig. 3, thus imparting clockwise motion to the range finder control rod or shaft 60. Also a clockwise motion is imparted to the cam 84 which causes the arm or lever 81 to be moved in the direction of the arrow 128 on Fig. 4.

While I have shown and described in detail certain mechanical connections between the movable camera front 46 and the range finder control rod 60, it is to be understood that I am not limited to the use of said mechanical connections, but that such other means may be substituted as will provide for the correlative movement of the said parts, the illustrated means having been selected merely as one example or embodiment of means that may be employed for the purpose.

Having thus described one illustrative embodiment of the invention, it is to be understood that although specific terms are employed, they are used in a generic and descriptive sense and not for purposes of limitation, the scope of the invention being set forth in the following claims, which are directed solely to the combination existing between the range and view finder and the illuminable projector both built into the camera structure for coordinated action, each of said features being manually operable by the operator in proper timed relation to each other without either feature interfering with the operation of the other feature.

I claim:

1. Means for range-finder focusing of a photographic camera in insufficient or wholly lacking natural light, including, in combinaton, a main camera casing, a movable objective lens carried thereby movable to and fro for focusing purposes, a range finder formed structurally as a unit with said camera casing, and including among its parts a viewing lens and an optical element movable in the functioning of the range finder, said objective lens and the movable element of the range finder being operatively connected so that the functioning of the range finder coincides with the focusing of the objective lens, and an illuminable projector secured structurally to the camera casing to constitute a part of the camera unit, said projector including an electric light bulb secured in such relation to the viewing lens of the range finder that the range finder viewing lens and said bulb may both be directed at the same time toward the object to be photographed, and means carried by the camera and accessible to the operator thereof while using the range finder of the camera, whereby, when said projector is illuminated and the image therefrom is projected on the object to be photographed as an image of the filament of the projector bulb and while said object otherwise remains in insufficient or wholly lacking natural light for photographing and is otherwise wholly unilluminated, the said objective lens may nevertheless then be focused upon the object to be photographed through the functioning-manipulation of the said movable-element range finder, while said image is so projected on the object to be photographed, the projected image of the filament thus being used as a feature in the adjustment of the range finder.

2. Means for range-finder focusing of a photographic camera in insufficient or wholly lacking natural light, including, in combination, a main camera casing, a movable objective lens carried thereby movable to and fro for focusing purposes, a range finder formed structurally as a unit with said camera casing, and including among its parts a viewing lens and an optical element movable in the functioning of the range finder, said objective lens and the movable element of the range finder being operatively connected so that the functioning of the range finder coincides with the focusing of the objective lens, and an illuminable projector secured structurally to the camera casing to constitute a part of the camera unit, said projector including a miniature electric light bulb secured in such proximity to the viewing lens of the range finder and in such relation thereto that the range finder viewing lens and said bulb may both be directed at the same time toward the object to be photographed and means carried by the camera and accessible to the operator while using the range finder, whereby, when said projector is illuminated and the image therefrom is projected on the object to be photographed as an enlarged image of the filament of the said projector bulb and while said object otherwise remains in insufficient or wholly lacking natural light for photographing and is otherwise wholly unilluminated, the said objective lens may nevertheless then be focused upon the object to be photographed through the functioning-manipulation of the said movable-element range finder, while said image is so projected on the object to be photographed, the said illuminable projector and the said range finder each being manually operable by the operator as stated while holding the camera, in proper timed relation to each other, without the manual operation of either interfering with the manual operation of the other.

3. Means for speedy, range-finder focusing of a photographic camera in insufficient or wholly lacking natural light, including, in combination, a main camera casing, a movable objective lens carried thereby, movable to and fro for focusing purposes, a range finder housing structurally attached to the camera casing at the top thereof, with the camera held upright, a range finder in said housing and including among its parts a viewing lens and an optical element movable in the functioning of the range finder, said objective lens and said range finder being operatively connected so that the functioning of the range finder coincides with the focusing of the objective lens, an illuminable projector also built into the camera casing underneath and close to said range finder housing, said projector including a miniature electric light bulb with filament, which bulb is in close proximity to the viewing lens of the range finder, and in such relation thereto that the range finder viewing lens and said bulb may both be directed at the same time toward the object to be photographed, and light controlling means for lighting the filament of said bulb extending through the camera casing so as to be readily accessible to a hand of the operator while focusing the camera, a magnifier lens mounted in the housing in front of said bulb, said filament being so positioned that its image when projected onto the object to be photographed is in universal focus for distances greater than about five feet, whereby when said projector is illuminated and the image of said filament is projected onto the object to be photographed, the said objective lens may then be speedily focused upon the object to be photographed by the operator through the functioning-manipulation of the movable-element range finder, and substantially simultaneously with his act of illuminating the bulb by manipulating said light-controlling means extending through the camera casing.

EDSON S. HINELINE.